United States Patent
Cheng

(10) Patent No.: US 9,182,799 B2
(45) Date of Patent: Nov. 10, 2015

(54) USB OTG DEVICE WITH POWER MODE SWITCH FUNCTION

(71) Applicant: ShenZhen Goldsun Network Intelligence Technology Co., Ltd., Shenzhen (CN)

(72) Inventor: Hai-Long Cheng, Shenzhen (CN)

(73) Assignee: ShenZhen Goldsun Network Intelligence Technology Co., Ltd., ShenZhen (CN)

( * ) Notice: Subject to any disclaimer, the term of this patent is extended or adjusted under 35 U.S.C. 154(b) by 196 days.

(21) Appl. No.: 13/974,053

(22) Filed: Aug. 23, 2013

(65) Prior Publication Data

US 2015/0006919 A1    Jan. 1, 2015

(30) Foreign Application Priority Data

Jun. 28, 2013  (CN) .................. 2013 1 02686336

(51) Int. Cl.
*G06F 1/26*  (2006.01)

(52) U.S. Cl.
CPC ....................... *G06F 1/26* (2013.01)

(58) Field of Classification Search
None
See application file for complete search history.

(56) References Cited

U.S. PATENT DOCUMENTS

2006/0199435 A1*  9/2006  Foo et al. .............. 439/638
2007/0033308 A1*  2/2007  Teng et al. ............. 710/62

* cited by examiner

*Primary Examiner* — Mark Connolly
*Assistant Examiner* — Paul J Yen
(74) *Attorney, Agent, or Firm* — Novak Druce Connolly Bove + Quigg LLP

(57) ABSTRACT

A USB OTG device includes a USB interface having a VBUS pin and an ID pin. A voltage input pin of a first switch is connected to a power source VDD5V. A voltage output pin of the first switch is connected to the VBUS pin and a second switch. The VBUS pin is connected to a power source Vcc. When the voltage at the ID pin is logic high, the voltage at an enable pin of the first switch is set to be logic high, the first switch is on, the second switch is off, thus the USB OTG device provides power to an external device. When the voltage at the ID pin is logic low, the voltage at the enable pin is set to be logic low, the first switch is off, the second switch is on, thus an external device provides power to the USB OTG device.

5 Claims, 1 Drawing Sheet

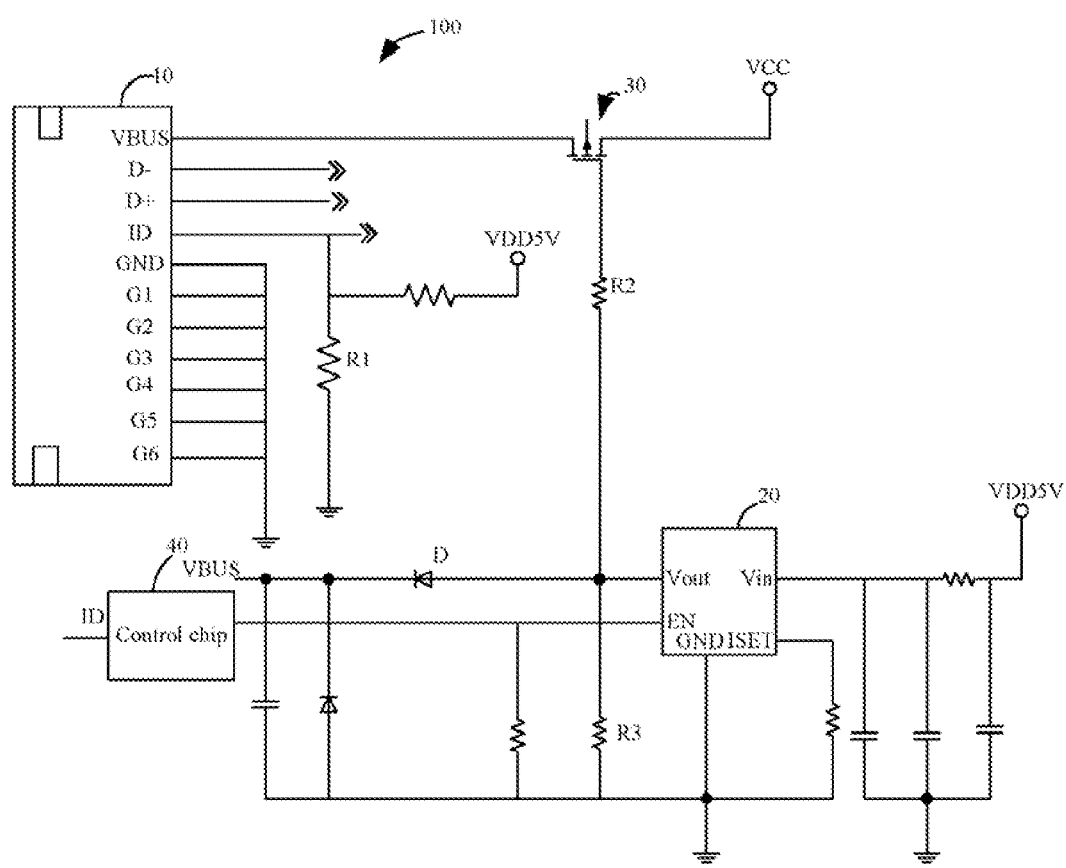

USB OTG DEVICE WITH POWER MODE SWITCH FUNCTION

BACKGROUND

1. Technical Field

The present disclosure relates to universal serial bus (USB) on-the-go (OTG) devices, and particularly to a USB OTG device having a power mode switch function.

2. Description of Related Art

USB OTG devices, known as dual-role peripherals, can act as limited hosts or peripherals. When the USB OTG device acts as a limited host, the USB OTG device provides power to a peripheral connected to the USB OTG device. This power mode is regarded as a self-power mode. When the USB OTG device acts as a peripheral, the USB OTG device obtains power from a personal computer. This power mode is regarded as a bus-power mode. Therefore, it is desired to provide a USB OTG device capable of automatically switching the USB OTG device between the self-power mode and the bus-power mode.

BRIEF DESCRIPTION OF THE DRAWINGS

Many aspects of the present disclosure should be better understood with reference to the following drawing.

The drawing is a circuit diagram of an embodiment of a USB OTG device with a power mode switch function.

DETAILED DESCRIPTION

Embodiments of the present disclosure are described in detail, with reference to the accompanying drawing.

Referring to the drawing, an embodiment of a USB OTG device 100 includes a USB interface 10, a first switch 20, a second switch 30, and a control chip 40. The USB interface 10 includes a VBUS pin, a D– pin, a D+ pin, an ID pin, and a GND pin. The ID pin is grounded via a pull-down resistor R1, and used to determine a type of an external electronic device (not shown) connected to the USB interface 10. When an external electronic device which needs to obtain power from the USB OTG device 100 (e.g., USB disk) is connected to the USB interface 10, the voltage at the ID pin is logic high. When an external electronic device which can provide power to the USB OTG device 100 (e.g., a personal computer) is connected to the USB interface 10, the voltage at the ID pin is logic low.

The first switch 20 includes a voltage input pin, a voltage output pin, and an enable (EN) pin. When the voltage at the EN pin is logic high, the first switch 20 is turned on. When the voltage at the EN pin is logic low, the first switch 20 is turned off. The voltage input pin is connected to a power source VDD5V of the USB OTG device 100. The voltage output pin is connected to an end of the second switch 30 and the VBUS pin. In this embodiment, the voltage output pin is connected to the VBUS pin via a diode, with the voltage output pin being connected to an anode of the diode, and the VBUS pin being connected to the cathode of the diode. In this embodiment, the control chip 40 is connected between the ID pin and the EN pin. When the voltage at the ID pin is logic high, the control chip 40 sets the voltage at the EN pin to be logic high, and the first switch 20 is turned on. When the voltage at the ID pin is logic low, the control chip 40 sets the voltage at the EN pin to be logic low, and the first switch 20 is turned off.

The VBUS pin is further connected to a power source Vcc of the USB OTG device 100 via the second switch 30. When the voltage at the EN pin is logic high, the second switch 30 is turned off. When the voltage at the EN pin is logic low, the second switch 30 is turned on. In this embodiment, the second switch 30 is a metal-oxide-semiconductor-field-effect transistor (MOSFET). The gate of the MOSFET is connected to the voltage output pin and grounded via resistors R2, R3, the source of the MOSFET is connected to the VBUS pin, and the drain of the MOSFET is connected to the power source Vcc. When the first switch 20 is turned on, the voltage at the gate is logic high, and the MOSFET is turned off. When the first switch 20 is turned off, the voltage at the gate is logic low, and the MOSFET is turned on. In this embodiment, the MOSFET is a PMOSFET.

In this embodiment, when an external electronic device which needs to obtain power from the USB OTG device 100 is connected to the USB interface 10, the voltage source VDD5V of the USB OTG device 100 provides power to the VBUS pin via the first switch 20, thus providing power from the USB OTG device 100 to the external electronic device. When an external electronic device which can provide power to the USB OTG device 100 is connected to the USB interface, power from the external electronic device is transmitted to the power source Vcc via the VBUS pin, that is, the USB OTG device 100 obtains power from the external electronic device.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A universal serial bus (USB) on-the-go (OTG) device comprising:
   a USB interface comprising an identification (ID) pin grounded via a pull-down resistor and a VBUS pin;
   a first switch comprising a voltage input pin, a voltage output pin, and an enable pin; and
   a second switch;
   wherein the voltage input pin is connected to a power source VDD5V of the USB OTG device, the voltage output pin is connected to the VBUS pin and an end of the second switch, and the VBUS pin is further connected to a power source Vcc via the second switch; when the voltage at the ID pin is logic high, the voltage at the enable pin is set to be logic high, the first switch is turned on, and the second switch is turned off; when the voltage at the ID pin is logic low, the voltage at the enable pin is set to be logic low, the first switch is turned off, and the second switch is turned on.

2. The USB OTG device as described in claim 1, further comprising a control chip connected between the enable pin and the ID pin, wherein when the voltage at the ID pin is logic high, the control chip sets the voltage at the enable pin to be logic high, and when the voltage at the ID pin is low, the control chip sets the voltage at the enable pin to be logic low.

3. The USB OTG device as described in claim 1, wherein the second switch is a metal-oxide-semiconductor-field-effect transistor (MOSFET), the gate of the MOSFET is connected to the voltage output pin and grounded, the source of the MOSFET is connected to the VBUS pin, and the drain is connected to the power source Vcc.

4. The USB OTG device as described in claim 3, wherein the MOSFET is a PMOSFET.

5. The USB OTG device as described in claim 1, wherein the voltage output pin is connected to the VBUS pin via a diode, and the voltage output pin is connected to the anode of the diode.

* * * * *